Patented Oct. 17, 1939

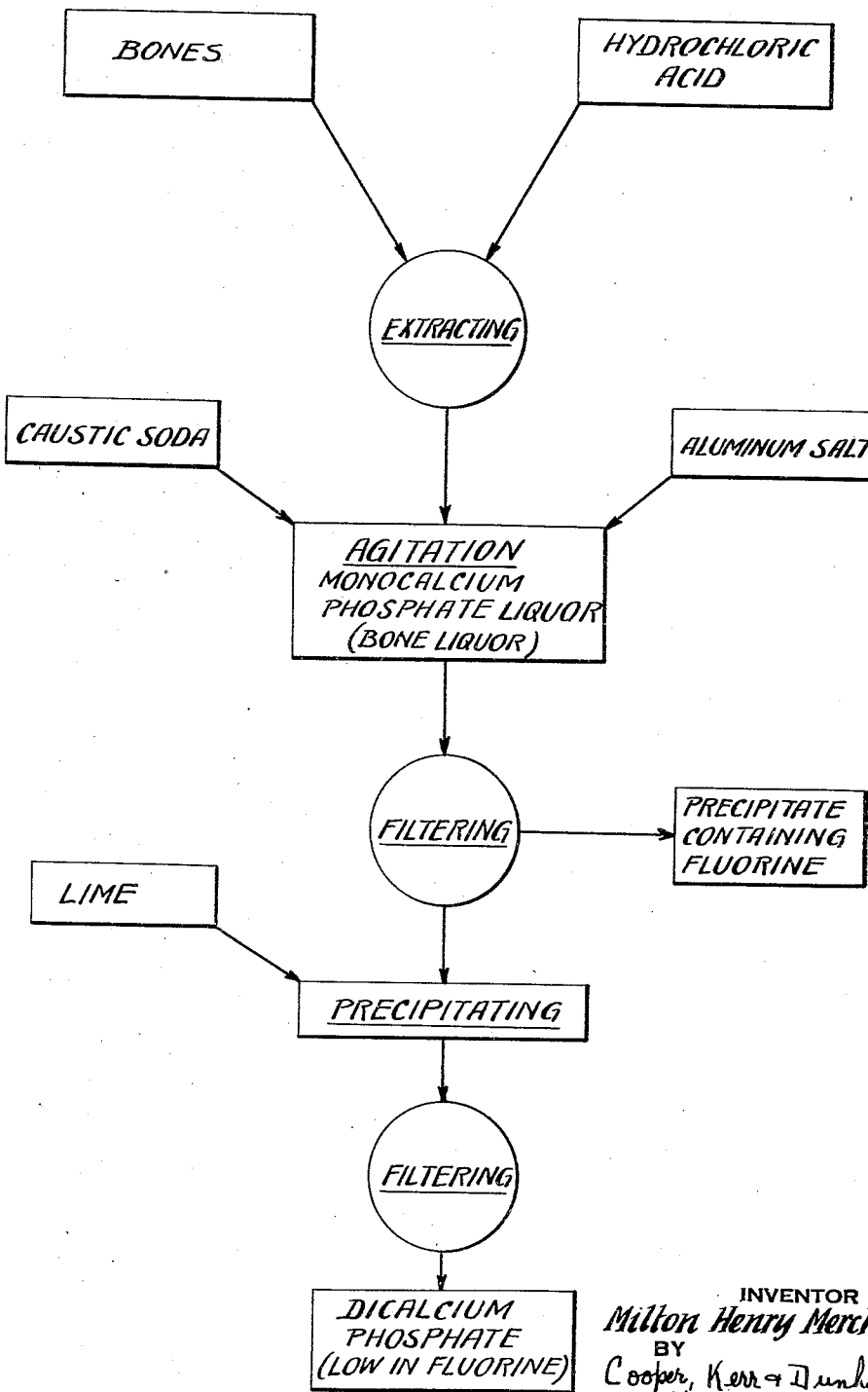

2,176,464

UNITED STATES PATENT OFFICE 2,176,464

METHOD OF REMOVAL OF FLUORINE COMPOUNDS FROM BONE LIQUORS

Milton H. Merchant, Dearborn, Mich., assignor to The American Agricultural Chemical Company, Newark, N. J., a corporation of Delaware Application August 5, 1937, Serial No. 157,519

1 Claim. (Cl. 23—109)

This invention relates to the purification of phosphate solutions, more particularly monocalcium phosphate solutions such as those commonly known as bone liquors. To that end, the invention comprises a new and improved process useful in the treatment of bone liquors to remove fluorine and fluorine compounds therefrom, or to reduce the fluorine content thereof to such amount as is not harmful in the resulting product or in the desired products, principally dicalcium phosphate, recovered therefrom.

An object of the invention is to remove fluorine or fluorine compounds from bone liquors containing calcium phosphates, to such extent that the remaining fluorine content thereof is permissible in the use for which the dicalcium phosphate or other product to be recovered from the liquor is intended.

A further object of the invention is to provide a new and useful process for the treatment of bone liquors, such as those obtained as a by-product in the manufacture of gelatin, with soluble aluminum compounds, to remove objectionable fluorine compounds from the liquors, or to reduce the fluorine content thereof to a point at which the remaining fluorine is not objectionable in the useful products thereafter recovered from the liquor.

Other objects of the invention will appear from the following description thereof, and claim.

A diagrammatic or schematic illustration of the process of the invention is shown in the accompanying drawing, and the legends forming a part thereof.

My process may be advantageously applied to the purification of such bone liquors as result from the treatment of animal bones in the manufacture of gelatin, and will be hereafter more particularly described in that connection. In the manufacture of gelatin from animal bones, the mineral matter is first extracted by treating or leaching the bones with an acid such as hydrochloric acid, although other acids, as sulfurous or phosphoric acids may sometimes be used. The bones consist of a combination of mineral and organic matter. The mineral matter consists largely of various phosphates of calcium, and, for practical purposes, may be considered as being largely a tricalcium phosphate, $Ca_3P_2O_8$. The aforesaid treatment of the bones with hydrochloric or other acid dissolves the mineral matter, leaving the organic matter of the bone which, after being thus leached with acid, is called ossein. By further suitable treatment the latter may be converted to gelatin and used or sold in that form. The acid solution of the mineral matter, however, contains valuable phosphates which it is desired to recover, generally in the form of dicalcium phosphate, which is then sold for a variety of food purposes and human consumption in other forms. For such use, however, it is desirable that the fluorine content of the dicalcium phosphate should be as low as possible.

In the case of de-mineralization of bones with hydrochloric acid, commonly employed (and which will be used as illustrative throughout the rest of this description), the reaction may be approximately represented by the following equation:

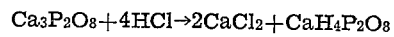
$$Ca_3P_2O_8 + 4HCl \rightarrow 2CaCl_2 + CaH_4P_2O_8$$

In the process heretofore employed, the resulting phosphates are next recovered in the form of dicalcium phosphate, by neutralizing the phosphate liquor with milk of lime, which precipitates the dicalcium phosphate substantially in accord with the following reaction:

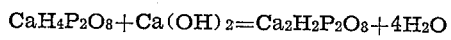
$$CaH_4P_2O_8 + Ca(OH)_2 = Ca_2H_2P_2O_8 + 4H_2O$$

The latter compound is also sometimes represented by the formula:

$$CaHPO_4 \cdot 2H_2O$$

Since the bones ordinarily used in the manufacture of gelatin may contain of the order of approximately 0.15%, or more, of the element fluorine, usually combined in the form of various salts thereof such as calcium fluoride, the fluorine content of the bones is extracted by the acid employed in the de-mineralization step, and is thereafter precipitated by the lime, largely in the form of calcium fluoride, $CaF_2$, along with the dicalcium phosphate.

Fluorine is ordinarily considered objectionable in foods, or in chemicals to be used for human consumption, and it has been found that the fluorine content of the dicalcium phosphate prepared as described above may sometimes run as high as 1000 parts per million, or even more. Good dicalcium phosphate of commercial grade preferably contains fluorine not more than about 0.03% or 300 parts per million, at the most, and it is desirable for some purposes that the fluorine content thereof be reduced even below that amount, preferably to as low a value as possible, say of the order of about 20 to 40 parts per million.

A commercially satisfactory and practical method of reducing the fluorine content of the dicalcium phosphate prepared as above stated has long been sought, and many attempts have been made, by precipitation, volatilization, and a variety of other methods. So far as I know, however, no satisfactory or economically feasible method of eliminating, or even satisfactorily reducing, the fluorine content of dicalcium phosphate prepared from bones in the manner described above had ever been discovered before my present invention.

By a long series of experiments and investigations, I have discovered that if the bone liquor is, prior to the step of precipitating the dicalcium phosphate with lime or milk of lime, treated with certain soluble aluminum salts, such as aluminum sulphate, aluminum chloride or a sodium aluminate, and if the acidity of the resulting solution is then properly adjusted and controlled, as by the addition of soluble alkali metal salts, such as sodium salts, preferably caustic soda, the objectionable fluorine compounds are very largely precipitated from the solution in the form of calcium fluoride or other insoluble fluoride, principally a sodium aluminum fluoride represented by the formula:

$$Na_3AlF_6$$

A specific example of the process according to my invention, which I have found to give excellent results in actual practice, and which affords a proper control of the acidity of the solution, and is the best method of practicing the invention now known to me, is as follows:

Approximately 25,400 pounds (3,000 gallons) of monocalcium phosphate liquor resulting from the treatment of bones with hydrochloric acid, and containing about 11% of solids (CaO:3.50; $P_2O_5$:2.68; Cl:3.25; organic:2.08) is treated by the addition thereto of approximately 65 pounds of aluminum chloride of the formula $AlCl_3.6H_2O$, in sufficient water to dissolve it. The acidity of the solution is then adjusted and controlled by adding caustic soda solution (NaOH) thereto until the pH value of the solution is brought to approximately 4.2. Some variation from that exact pH value may be permissible under certain conditions, but the pH value of the liquor is preferably maintained at least within the range of about 4.0 to 4.3 during the removal of the fluorine carrying precipitate. In general, the higher the pH of the liquor during this precipitation, the more complete is the fluorine removal from the liquor, however, the greater is the loss of phosphate, and conversely, the lower the pH, the less the fluorine removal, and the less the phosphate loss, giving an ultimate higher recovery of phosphate. The exact amount of caustic soda solution which must be added to bring the pH concentration to the proper value will vary slightly with different runs of bone liquors, but from approximately 75 to 100 pounds of caustic soda (NaOH) will ordinarily be sufficient. The solution is preferably agitated during the addition of the caustic soda solution, and the agitation may be continued for from about fifteen to thirty minutes after the solution is brought to the correct pH value. Approximately 20 pounds of a suitable filter aid, such as filter-cell or diatomaceous earth, or kieselguhr, may then be added, and the solution is then filtered.

The filtered solution is then further neutralized with milk of lime as in the usual process, say until a pH value of about 4.5 to 5.0 is reached, and the resulting precipitate of dicalcium phosphate may then be separated by filtration, washed to remove soluble chlorides and other impurities, then dried and screened to the desired fineness. It will, according to the foregoing specific example, ordinarily be found to contain less than about 30 parts per million of fluorine, and may, with care, be brought as low as 20 parts per million, or even lower, whereas dicalcium phosphate made from the same liquor, but without the treatment according to my invention, is ordinarily found to contain from about 200 to 300 parts per million of fluorine. In general, the greater the amount of soluble aluminum salt employed the better seems to be the removal of fluorine compounds from the liquor but too large an excess of aluminum salts should be avoided.

In the accompanying diagram, the raw materials are shown as being bones and hydrochloric acid, which are fed into an extracting tank shown at the top of the diagram. The resulting liquor is then drawn off from the demineralized bones and passed to the next tank below, in which it is agitated after addition of the indicated reagents, as previously described. From the agitator, the liquor goes to the filter indicated below, where the precipitate containing the objectionable fluorine compounds is separated from the liquor. The clear liquor, now greatly reduced in fluorine content, is next passed to the precipitating tank where the desired dicalcium phosphate is formed by addition of lime, also as previously described. The resulting dicalcium phosphate is then washed and recovered in the last filter, and may be dried, ground and screened, and is then ready for use.

The process herein described, and the specific example given, are the best embodiments of my invention now known to me, but it is to be understood that the invention is not necessarily or specifically limited thereto, but may be carried out in other ways, without departure from its spirit, within the scope of the following claim.

I claim:

In a process of purifying an acid bone liquor containing the dissolved mineral matter of bones, and made by reacting upon bones with a dilute acid which gives only soluble calcium salts, which liquor contains calcium, phosphoric acid radical, a dissolved fluorine compound, and acid, and in which the calcium-to-phosphoric-acid ratio is not less than in tricalcium phosphate; said solution also containing calcium in the form of a soluble calcium salt other than acid calcium phosphate; and which calcium and phosphoric acid radical are maintained in solution by an excess of acid; and which liquor contains not substantially more than about 11% of total solids; the improvements which comprise adding to such liquor an alkaline sodium compound and a soluble aluminum compound, the amount of such sodium compound being sufficient to bring the pH value of the liquor to between about 4.0 and 4.3, and the amount of such soluble aluminum compound being sufficient to precipitate substantially all of the dissolved fluorine; agitating the liquor until substantially complete precipitation of the dissolved fluorine compounds occurs; and removing the fluorine-containing precipitate from the liquor to leave a liquor which is substantially free from soluble fluorine compounds.

MILTON H. MERCHANT.